(12) United States Patent
Ruppert

(10) Patent No.: US 8,171,155 B2
(45) Date of Patent: *May 1, 2012

(54) DOWNLOAD AND DATA TRANSFER GAMING METHOD

(75) Inventor: Ryan Ruppert, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 53 days.

This patent is subject to a terminal disclaimer.

(21) Appl. No.: 12/813,768

(22) Filed: Jun. 11, 2010

(65) Prior Publication Data

US 2010/0248842 A1    Sep. 30, 2010

Related U.S. Application Data

(63) Continuation of application No. 12/113,150, filed on Apr. 30, 2008, now Pat. No. 7,743,163.

(51) Int. Cl.
   *G06F 15/16* (2006.01)
   *A63F 9/14* (2006.01)
(52) U.S. Cl. ............................ 709/232; 709/223; 463/42
(58) Field of Classification Search .................. 709/232, 709/223; 463/42
   See application file for complete search history.

(56) References Cited

U.S. PATENT DOCUMENTS

| | | | | |
|---|---|---|---|---|
| 5,742,738 | A * | 4/1998 | Koza et al. | 706/13 |
| 7,076,553 | B2 * | 7/2006 | Chan et al. | 709/226 |
| 7,559,070 | B2 * | 7/2009 | Nakamura et al. | 725/31 |
| 2002/0027324 | A1 * | 3/2002 | Webb | 273/292 |
| 2002/0131423 | A1 * | 9/2002 | Chan et al. | 370/400 |
| 2003/0070174 | A1 * | 4/2003 | Solomon | 725/98 |
| 2003/0233455 | A1 * | 12/2003 | Leber et al. | 709/226 |
| 2004/0194150 | A1 * | 9/2004 | Banker | 725/135 |
| 2005/0036795 | A1 * | 2/2005 | Karagiannis et al. | 399/27 |
| 2006/0035713 | A1 * | 2/2006 | Cockerille et al. | 463/42 |
| 2007/0217588 | A1 * | 9/2007 | Bitterlich | 379/201.03 |
| 2008/0162666 | A1 * | 7/2008 | Ebihara et al. | 709/217 |
| 2008/0235323 | A1 * | 9/2008 | Block | 709/201 |
| 2009/0170607 | A1 * | 7/2009 | Chiao et al. | 463/42 |
| 2009/0234967 | A1 * | 9/2009 | Yu et al. | 709/232 |

\* cited by examiner

*Primary Examiner* — Patrice Winder
*Assistant Examiner* — Ebrahim Golabbakhsh
(74) *Attorney, Agent, or Firm* — Philip J. Anderson

(57) ABSTRACT

A download and data transfer gaming system utilizes a hybrid peer-to-peer, segmented file distribution protocol to vastly improve the download capabilities of a gaming system by improving the upload cost burdened by the download host. The system redistributes this cost to the download clients by allowing clients on the gaming system to upload pieces of a file to each other. This system is much more redundant by eliminating the possibility of a client missing a download broadcast. The system alleviates this possibility of missing packets and bad data integrity by using SHA-1 verification of the file pieces. The benefits of the improved bandwidth capabilities enable the download of much larger files, thus enhancing the game play experience.

20 Claims, 8 Drawing Sheets

DOWNLOAD AND DATA TRANSFER GAMING METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is a related to U.S. patent application Ser. No. 11/740,224, filed Apr. 25, 2007, entitled LOCAL GAME-AREA NETWORK SYSTEM which is herein incorporated by reference in its entirety. This application is related to co-pending U.S. patent application Ser. No. 12/113,153, filed Apr. 30, 2008, entitled DOWNLOAD AND DATA TRANSFER GAMING METHOD.

FIELD

This disclosure relates generally to gaming machine systems and methods. More particularly, this disclosure relates to a gaming systems and methods that include download and/or data transfer capabilities.

BACKGROUND

Various networked gaming systems have been developed over the years beginning at least in the 1980's. With acceptance and utilization, users such as casino operators have found it desirable to increase the computer management of their facilities and expand features available on networked gaming systems. For instance, there are various areas in the management of casinos that is very labor intensive, such as reconfiguring gaming machines, changing games on the gaming machines, and performing cash transactions for customers. In such networked gaming systems, effective methods of transferring data are becoming increasing important.

The most common method by which files are transferred over networks is the client-server model. In this configuration, a central server sends the entire file to each client that requests it. Both HTTP (hyper text transfer protocol) and FTP (file transfer protocol) function in this manner. In the client-server model, the clients only speak to the server and do not speak to each other. A main advantage of client-server model is its simplicity to configure. Additionally, the files are typically always available since the servers usually are dedicated to the task of serving. As such, the servers are always on and connected to a network.

However, the client-server model encounters significant problems with data files that are large or very popular, or both. Otherwise stated, it requires a large amount of bandwidth and server resources to distribute such a data file, since the server must transmit the entire file to each client. Techniques such as mirroring and load balancing have been utilized in an attempt to address these shortcomings by distributing the load across multiple servers. Nevertheless, these techniques typically require a lot of coordination and effort to set up and are not always feasible.

Another method of transferring files is through peer-to-peer networks. Notable peer-to-peer networks include, by way of example only: Kazaa, Gnutella, Direct Connect, and the like. Typically, in such a peer-to-peer networks, ordinary users trade files by directly connecting one-to-one to other user's computers. An advantage of peer-to-peer networks is that files can be shared without having access to a proper server. Accordingly, there is little accountability for the contents of the files. Typically, a downloading user receives a file from a single source (e.g., another user in the peer-to-peer network).

In a peer-to-peer network, the bandwidth problem discussed above is somewhat mitigated since there is a greater chance that a popular data file will be offered by a larger number of peers. The breadth of files available tends to be fairly good in a peer-to-peer network, although the download speeds for more obscure data files tend to be lower. Another common problem sometimes associated with peer-to-peer network is the significant protocol overhead for passing search queries amongst the peers. As a result, the number of peers that one can reach is often limited. Additionally, partially downloaded files are usually not available to other peers. The availability of data files is generally dependent on the goodwill of the users, since rules and/or restrictions regarding send/receive ratios are difficult to enforce.

Another protocol that is designed for transferring files is BitTorrent. BitTorrent is a variation of a peer-to-peer network in which users connect to each other directly to send and receive portions of a file. However, unlike a true peer-to-peer network, BitTorrent does utilize a central server, which is referred to as a tracker, that coordinates the action of all peers in the network. The tracker only manages connections. The tracker does not have any knowledge of the contents of the files being distributed. Accordingly, a large number of users can be supported with relatively limited tracker bandwidth. A core functionality of the BitTorrent protocol is that users are able to upload (transmit outbound) at the same time they are downloading (receiving inbound). In this manner, network bandwidth is utilized with great efficiently. Interestingly, BitTorrent functions at an increasingly higher level of productivity as the number of people interested in a certain file increases, in contrast to other file transfer protocols.

In one exemplary situation, a group of five editors are sitting around a table who are each trying to get a complete copy of a document. The first editor announces that he has a first subset of the total pages. The third, forth, and fifth editors are each missing some of the pages in the first subset of the total pages. These editors coordinate such that the first editor gives the third, forth, and fifth editors the pages that they are missing. The second editor then announces that he has a second subset of the total pages. Some of the remaining editors are missing pages from the second subset of the total pages. These editors coordinate such that the second editor gives the other editors the pages that they are missing. The process continues around the table until everyone has announced what pages they have and what pages they are missing. The editors at the table coordinate to swap pages of the document until all the editors have all the pages of the document.

Continuing with this exemplary situation, there is also another person at the table who happens to be the author of the document. This author has a complete copy of the document, and thus, does not need any pages from the editors to be sent to him. The author responds to the editors with pages that none of the editors have at the table. In the beginning, all of the editors must talk to the author to get their first subset of total pages. To increase efficiency, the editors should each request and receive different pages from the author. Very quickly, all of the editors have most of the pages amongst themselves, even if no editor has the whole document. In this manner, the author can distribute the document to many editors, without having to give a full copy of the document to every editor. In contrast, the author distributes different pages of the document to different editors who are then able to share the document amongst themselves.

A connection link is choked when the BitTorrent client does not currently want to send anything on that connection link. A BitTorrent client signals that it is choked to other clients for a number of reasons, but the most common is that, by default, a client will only maintain a maximum number of active simultaneous uploads to requesting clients. The remaining requesting clients will receive the choked signal. The term interested refers to the state of a downloader with respect to a connection. A downloader is marked as interested if the other end of the link has any pieces that the client wants. Otherwise, the connection is marked as not interested. If a client has not received a data file after a certain period (e.g., default: 60 seconds), the client marks the connection as snubbed, meaning that the peer on the other end has chosen not to send in a while. The function of tracking this variable is to improve download speeds. Optimistic unchoking occurs when a client periodically shuffles its list of uploaders and tries sending on different connections that were previously choked, and choking the connections it was just using.

SUMMARY

Briefly, and in general terms, various embodiments are directed to a download and data transfer gaming method for configuring a gaming network. The gaming network includes at least one host server, a tracking server, and a plurality of gaming devices, wherein the gaming devices are capable of uploading and/or transferring data as well as downloading data. The gaming method includes: connecting the at least one host server to the plurality of gaming devices; connecting the tracking server to the plurality of gaming devices; interconnecting the plurality of gaming devices to each other; and identifying a set of data to be distributed, wherein the set of data can be divided into a plurality of different subsets of data; distributing the plurality of different subsets of data from a host server to a plurality of gaming devices, wherein none of the plurality of gaming devices receives the entire set of data to be distributed from the host server; and transferring the plurality of different subsets of data amongst the plurality of gaming devices until all of the gaming devices have received the entire set of data, without requiring further assistance from the host server; thereby improving the download capabilities of the gaming network by redistributing the burden from the host server to the gaming devices by enabling the gaming devices to upload subsets of data to each other.

In another embodiment, a download and data transfer gaming method improves download capabilities of a gaming network by redistributing a download burden from a host server to a plurality of gaming devices. The gaming method includes: enabling the gaming devices to upload and/or transfer subsets of data to each other; identifying a set of data to be distributed, wherein the set of data can be divided into a plurality of different subsets of data; distributing the plurality of different subsets of data from a host server to a plurality of gaming devices, wherein none of the plurality of gaming devices receives the entire set of data to be distributed from the host server; and transferring the plurality of different subsets of data amongst the plurality of gaming devices until all of the gaming devices have received the entire set of data, without requiring further assistance from the host server.

Other features and advantages will become apparent from the following detailed description, taken in conjunction with the accompanying drawings, which illustrate by way of example, the features of the various embodiments.

DETAILED DESCRIPTION

Figure 1A:
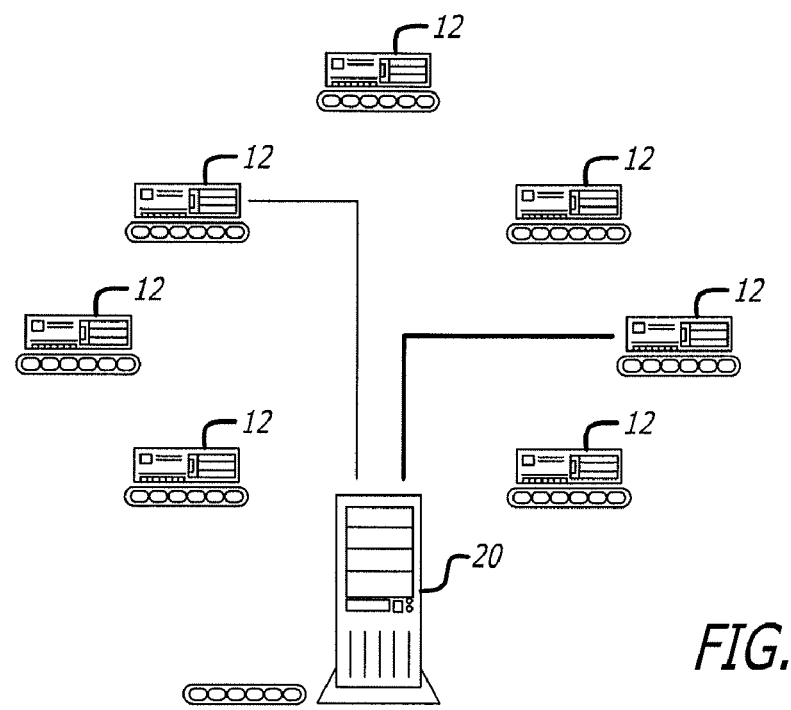
FIG. 1A-1H illustrate a gaming architecture configuration of the download and data transfer gaming system in various sequential stages in which a single data file is downloaded/transferred in segments to multiple gaming devices enabled with a hybrid peer-to-peer, segmented data transfer protocol.
Figure 1B:
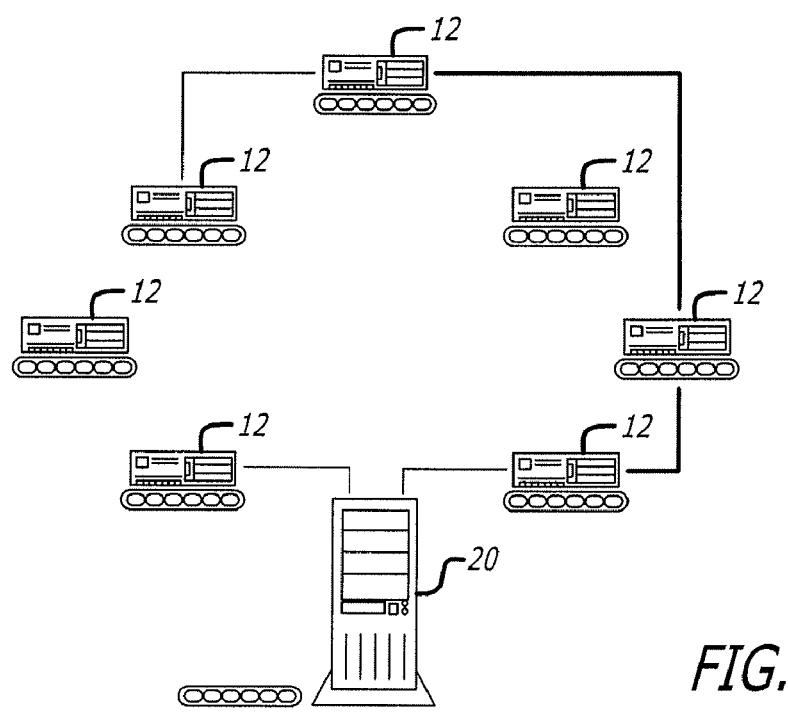
Figure 1C:
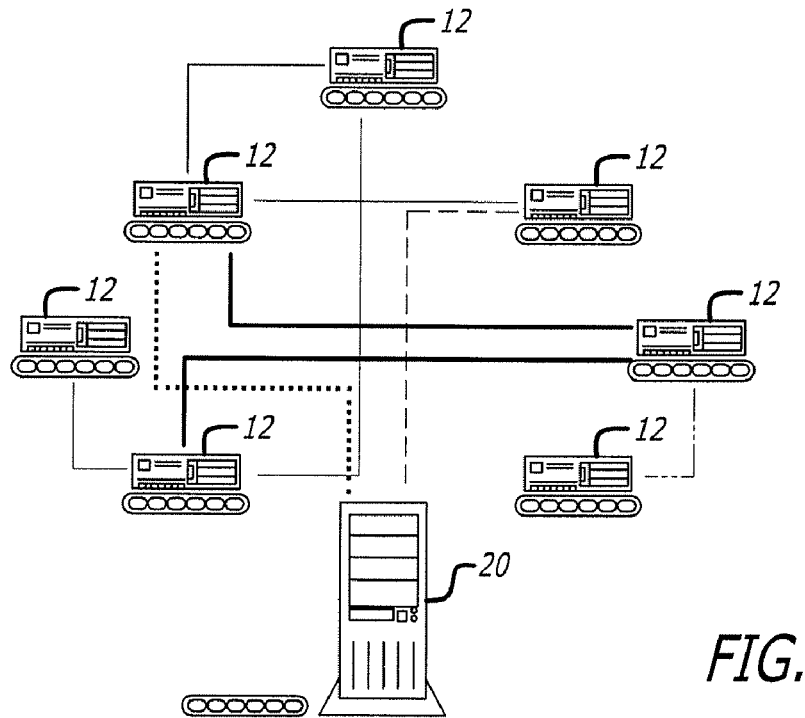
Figure 1D:
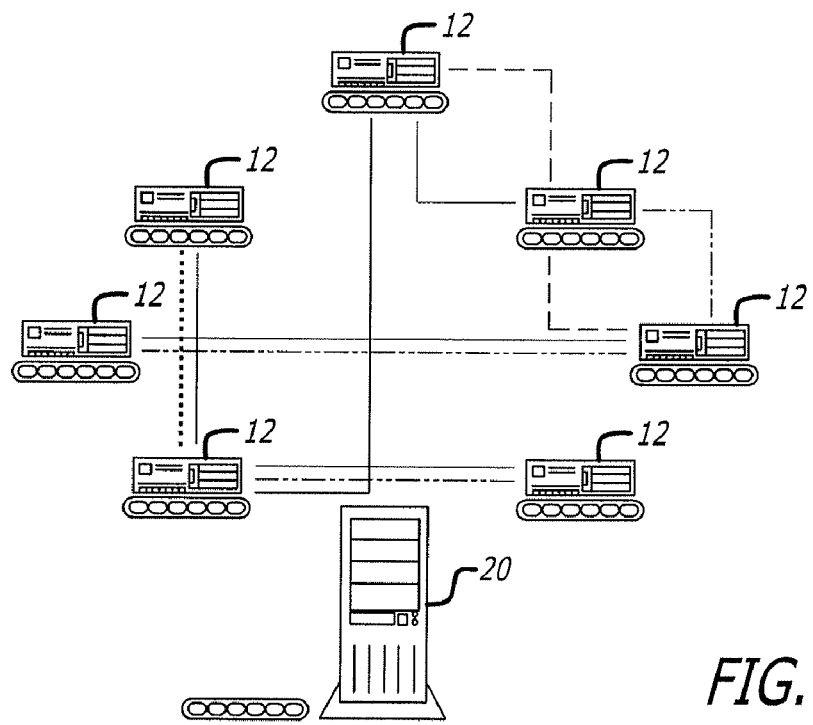
Figure 1E:
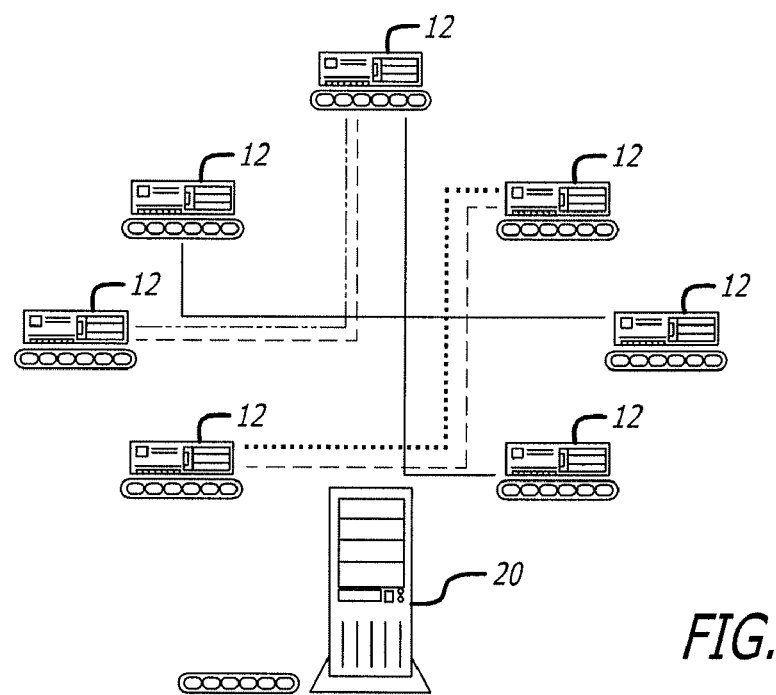
Figure 1F:
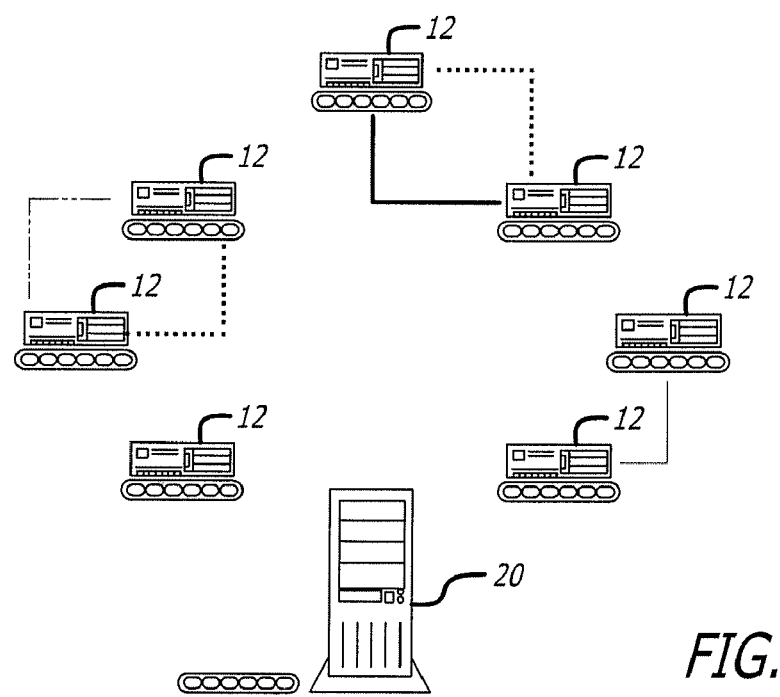
Figure 1G:
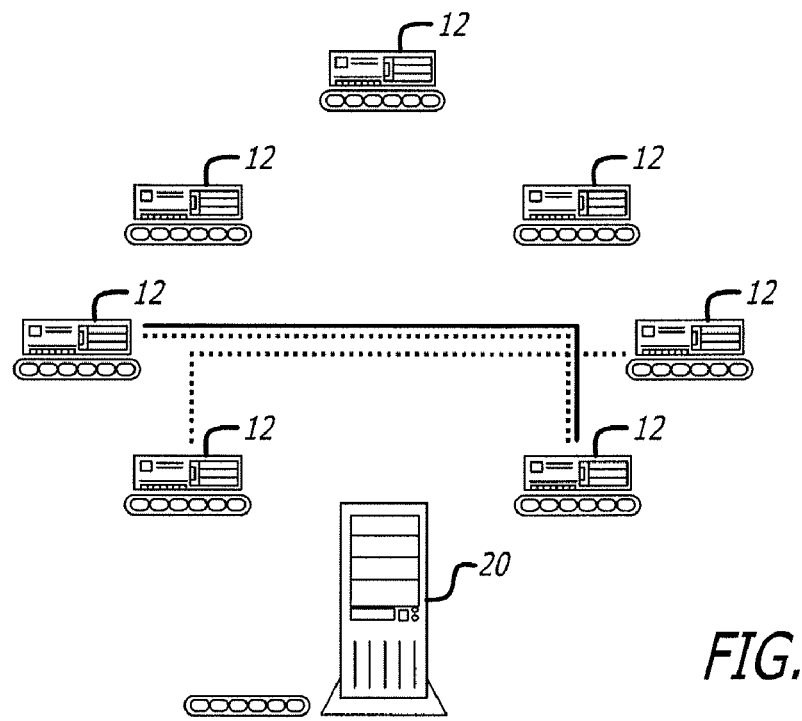
Figure 1H:
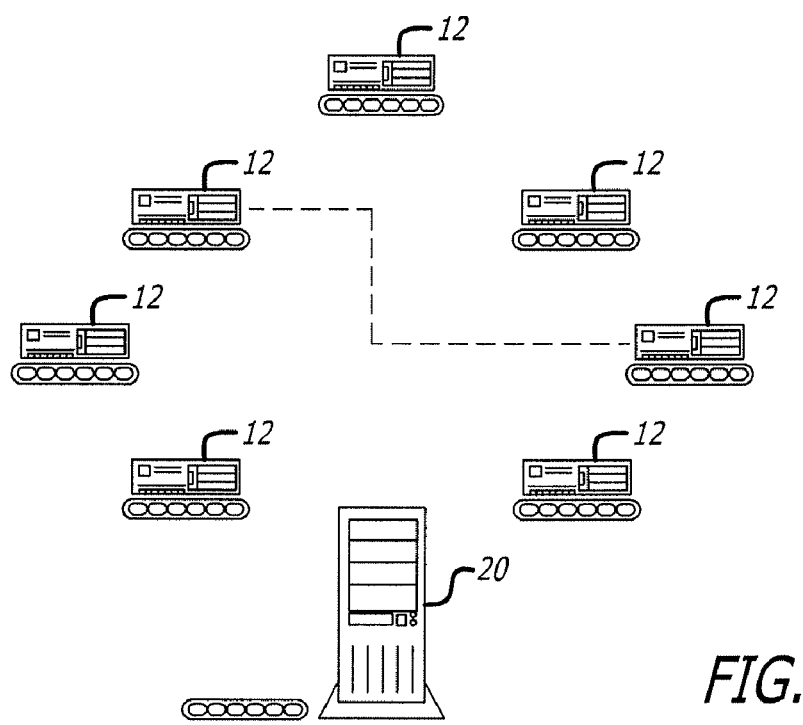
Figure 2:
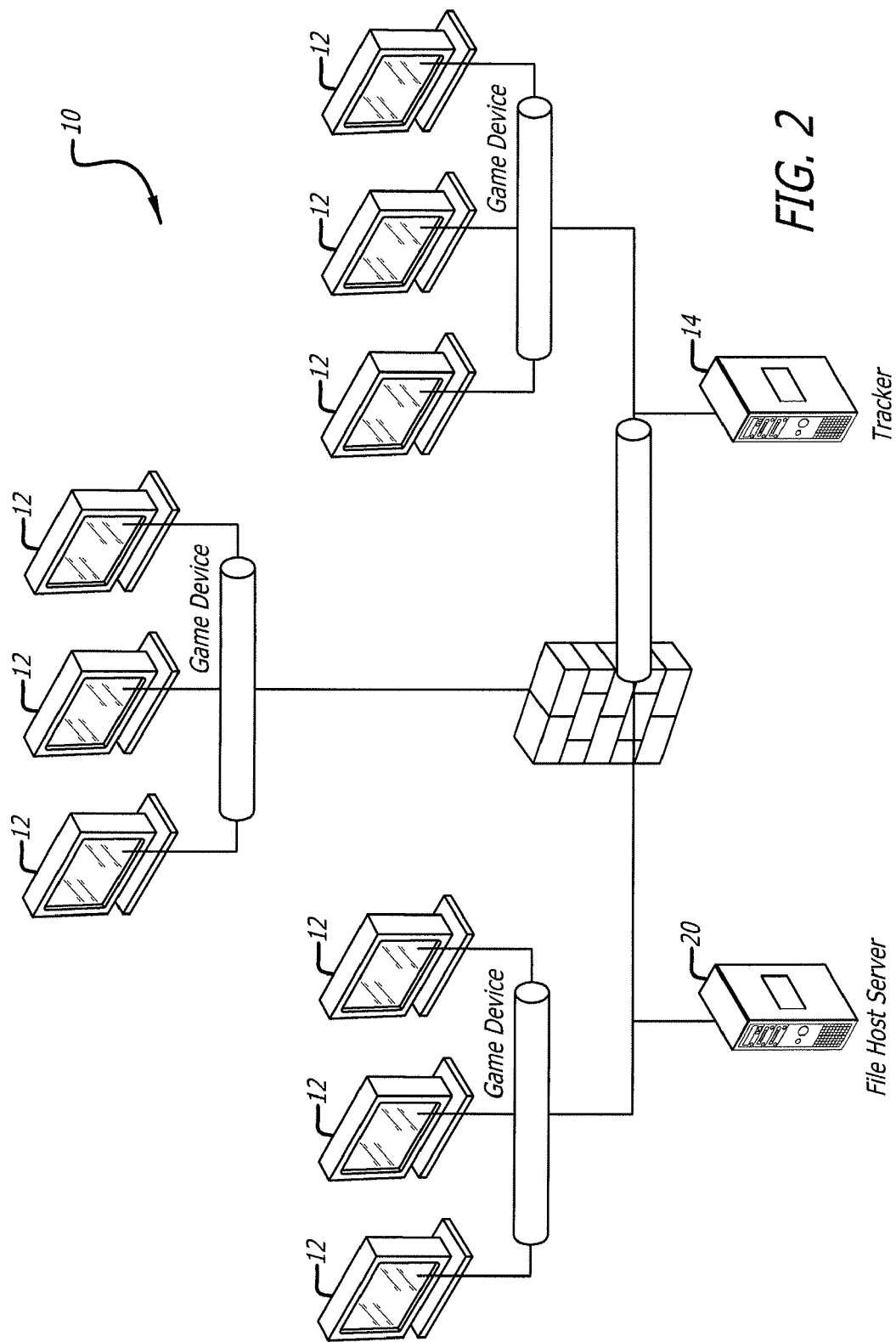
FIG. 2 illustrates a gaming architecture configuration implementing the download and data transfer gaming system in a WAN lottery-based system.

Referring now to the drawings, wherein like reference numerals denote like or corresponding parts throughout the drawings and, more particularly to FIGS. 1-2, there are shown various embodiments of a system for download and data transfer gaming. A preferred embodiment of the download and data transfer gaming system 10 is a download-capable gaming system which implements a hybrid peer-to-peer, segmented file distribution protocol (e.g., BitTorrent). In one embodiment, the system 10 uses "Tit-for-Tat" (e.g., prisoner's dilemma strategy, as described in game theory) as a method of seeking Pareto principle (i.e., 80% of the consequences stem from 20% of the causes) based efficiency in the context of file distribution. The download and data transfer gaming system 10 addresses the logistical file downloading limitations of existing download capable gaming systems. The capabilities of the download and data transfer gaming system 10 enable the downloading and/or distributing of much larger files like complex image files, high-definition video content, OS images, audio files, and the like to gaming devices 12 in the network.

The download and data transfer gaming system 10 utilizes a hybrid peer-to-peer, segmented file distribution protocol (e.g., BitTorrent) to vastly improve the download capabilities of a gaming system by improving the upload cost burdened by the download host. In this manner, download and data transfer gaming system 10 redistributes this cost to the download clients (e.g., gaming devices 12) by allowing clients on the gaming system to upload pieces of a file to each other. This is unlike the file broadcast method, since this method is much more redundant by eliminating the possibility of a client missing a download broadcast. The above-described protocol alleviates this possibility of missing packets and bad data integrity by using SHA-1 verification of the file pieces. The benefits offered by this system are particularly useful to lottery-based gaming systems, which often use slow and sometimes unreliable WAN connections. The download and data transfer gaming system 10 is capable of saving up to 90% of network bandwidth used by standard HTTP deliver solutions. The benefits of the improved bandwidth capabilities enable the download and/or transfer of much larger files to gaming devices 12 in the network, thus enhancing the game play experience.

As utilized in one embodiment of the download and data transfer gaming system 10, BitTorrent is a hybrid peer-to-peer file sharing (P2P) communications protocol that is capable of distributing large amounts of data to gaming devices 12 in the network without the original distributor incurring the entire costs of hardware, hosting and bandwidth resources. Instead, when data is distributed using the BitTorrent protocol in the system 10, each gaming device 12 supplies pieces of the data to newer gaming devices, reducing the cost and burden on any given individual source, providing redundancy against system problems, and reducing dependence on the original distributor (e.g., server).

In one embodiment of the download and data transfer gaming system 10, a BitTorrent client is any program that implements the BitTorrent protocol. Each client is capable of preparing, requesting, and transmitting any type of computer file over a network, using the protocol. A peer is any gaming device 12 running an instance of a client. To share a file or group of files, a peer first creates a small file called a "torrent." This file contains metadata about the files to be shared and about the tracker 14, which is a computer (e.g., server) that coordinates the file distribution. A seed is a computer (e.g., gaming device, server, and the like) that has a complete copy of a certain torrent. Peers (e.g., gaming devices 12) that want to download the file first obtain a torrent file for it, and connect to the specified tracker 14, which is a server that tells gaming devices 12 from which other gaming devices 12 to download the pieces of the file.

More specifically, in one embodiment of the download and data transfer gaming system 10, the tracker 14 is a server on a network that acts to coordinate the actions of BitTorrent clients. When a gaming device 12 opens a torrent, the gaming device contacts the tracker 14 and asks for a list of gaming devices to contact. Periodically throughout the transfer, the gaming device 12 checks in with the tracker 14 and communicates to the tracker how much the gaming device has downloaded and uploaded, how much the gaming device has left before finishing, and the state the gaming device is in (e.g., starting, finished download, stopping, and the like).

The download and data transfer gaming system 10, which implements BitTorrent download/transfer methodology, differs from a standard full-file HTTP request in several fundamental ways. First, BitTorrent makes many small P2P requests over different TCP sockets, while web-browsers typically make a single HTTP GET request over a single TCP socket. Additionally, BitTorrent typically downloads in a random or in a "rarest-first" approach that ensures high availability, while HTTP downloads in a sequential manner. Accordingly, a download and data transfer gaming system 10 that implements BitTorrent is able to achieve much lower costs, much higher redundancy, and much greater resistance to abuse than a regular HTTP server.

In a typical scenario in which an embodiment of the download and data transfer gaming system 10 is utilized, the client connects to the one or more trackers 14 specified in the torrent file. The client then receives a list of peers currently transferring pieces of the one or more files specified in the torrent from the one or more trackers 14. The client connects to those gaming devices 12 to obtain the various pieces. Such a group of gaming devices 12 connected to each other to share a torrent is called a swarm. If the swarm contains only the initial seeder (i.e., the server or gaming device 12 that contained the entire block of data to be distributed), the client connects directly to it and begins to request pieces. As gaming devices 12 enter the swarm, they begin to trade pieces with one another, instead of downloading directly from the seeder. In one embodiment of the download and data transfer gaming system 10, clients incorporate mechanisms to optimize their download and upload rates. In one non-limiting example, the gaming devices 12 download pieces in a random order to increase the opportunity to exchange data, which is only possible if two gaming devices 12 have different pieces of the file. The effectiveness of this data exchange depends largely on the policies that clients use to determine to whom to send data. In one embodiment, clients prefer to send data to gaming devices 12 that send data back to them (i.e., a "Tit-for-Tat" scheme), which encourages fair trading.

Some variations of "tit-for-tat" schemes involve a prisoner's dilemma strategy, as described in game theory. In game theory, the prisoner's dilemma is a type of non-zero-sum game in which two players may each "cooperate with" or "defect" (i.e., betray) the other player. In this type of game theory, as in all game theory, the only concern of each individual player (i.e., "prisoner") is maximizing the player's own payoff, without any concern for the other player's payoff. Under some game parameters, the equilibrium for this game is a Pareto-suboptimal solution. Otherwise stated, rational choice leads the two players to both "defect," even though each player's individual reward would be greater if they both played cooperate.

However, in the iterated prisoner's dilemma the game is played repeatedly. Thus, each player has an opportunity to "punish" the other player for previous non-cooperative play. Cooperation may then arise as an equilibrium outcome. The incentive to defect is overcome by the threat of punishment, leading to the possibility of a cooperative outcome. Therefore, if the game is infinitely repeated, cooperation may be a sub-game perfect Nash equilibrium, although both players defecting always remains an equilibrium. There are many other equilibrium outcomes as well. In one embodiment of the download and data transfer gaming system 10, there is Pareto equilibrium. Otherwise stated, 80% of the data downloads and transfers come from 20% of the gaming devices 12.

Various configurable topologies of the download and data transfer gaming system 10 are possible. FIG. 1 represents a simple deployment of the download and data transfer gaming system 10 where a single data file is downloaded/transferred to multiple gaming devices enabled with a hybrid peer-to-peer, segmented data transfer protocol. This example illustrates the download/transfer of a single file to multiple gaming devices 12 where individual pieces of an individual file are transferred in a segmented, pseudo-randomized manner. After the initial file pieces are transferred from the host, the pieces are individually transferred from gaming device 12 to a gaming device. This demonstrates how the original server (seeder) only needs to send out one copy of the file for all the gaming devices 12 to receive a copy. FIG. 2 represents a possible topology implementing the download and data transfer gaming system 10 in a WAN lottery-based system.

Figure 3:
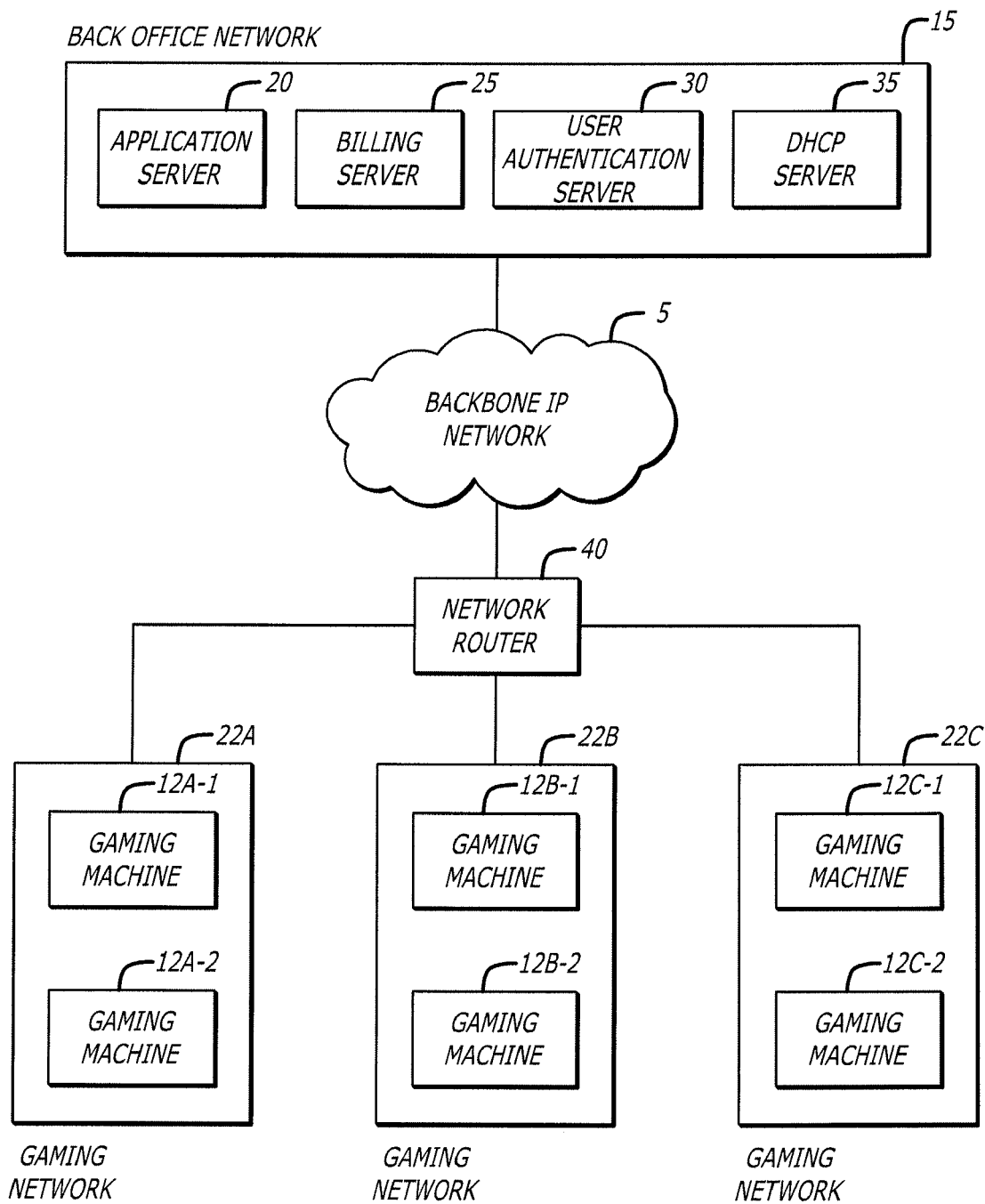
FIG. 3 illustrates a block diagram of a download and data transfer gaming system in accordance with one embodiment.

Referring now to FIG. 3, the networked gaming system may include one or more gaming networks 22 that each includes a plurality of gaming devices 12. In one embodiment, each gaming device 12 contains programming logic, which may be embodied in hardware and/or software to facilitate presentation of one or more gaming applications, such as games of chance, to the casino patrons. In one embodiment, each gaming network 22 is a Local Area Network (LAN) that spans one or more casinos (or property locations of the same or affiliated casinos). The networked gaming system may further include a back office network 15 that includes a plurality of computers servers that facilitate operation of the networked gaming system and its gaming networks 22. The gaming networks 22 may be connected to each other and to the back office network 15 through a network router 40 and via a broadband, IP-based backbone network 5, such as a Gigabit Ethernet, Asynchronous Transfer Mode ("ATM") network, or the like.

In one embodiment, the back office network 15 may include various computer servers. For example, an application server 20 provides various content updates for the gaming device 12, as well as facilitates monitoring of player wager information, player credits, winning events, and the like. The back office network 15 may further include a billing server 25, which provides secure credit card processing services for players utilizing credit/debit cards at the gaming device 12, as well as other billing and financial services, such as tracking of the cumulative jackpots across several gaming devices 12 and other services. The back office network 15 may further include a user authentication server 30 that maintains information about casino patrons. This information may be used to monitor patrons' winnings/rewards and to provide various personalized services to the casino patrons. The back office network 15 may also include a DHCP Server 35 that provides networking information, such as IP address scope, to the devices in the gaming network 22 using Dynamic Host Configuration Protocol (DHCP), or the like. The configuration of the back office network 15 is not limited to the one described above. Those of skill in the art will appreciate that the back office network 15 may include other servers and various network devices, such as routers and bridges, which facilitate operation of the networked gaming system.

In one embodiment, the networked gaming system may include a network router 40 or a similar networking device, which connects gaming networks 22 to the back office network 15 and facilitates data communication between the gaming devices 12 and gaming servers. In one embodiment, the router 40 may include Cisco Systems® 800 Series routers, Netgear® routers, and the like. The gaming networks 22 may be connected to the network router 40 using, for example, wired IEEE 802.3 connections (also known as Ethernet), wireless IEEE 802.11 interface (also known as Wi-Fi) or similar IP-based network interfaces. In one embodiment, the router 40 may be configured based on information provided by the DHCP server 35 during system startup. In another embodiment, the router 40 may be manually configured by the system administrator. By way of example only, and not by way of limitation, the router 40 may be configured to assign IP addresses to be used by the gaming machines 12 in each gaming networks 22. Additionally, the router 40 may be configured to provide various network and device configuration information to the gaming devices 12, such as gateway server location, network addresses, clock synchronization information, content updates and other services. Furthermore, the network router 40 may be configured to route data packets between gaming devices 12 and back office network servers using routing tables stored therein. Generally, the router 40 facilitates communication between devices within each gaming network 22 and network devices external to a given gaming network.

Figure 4:
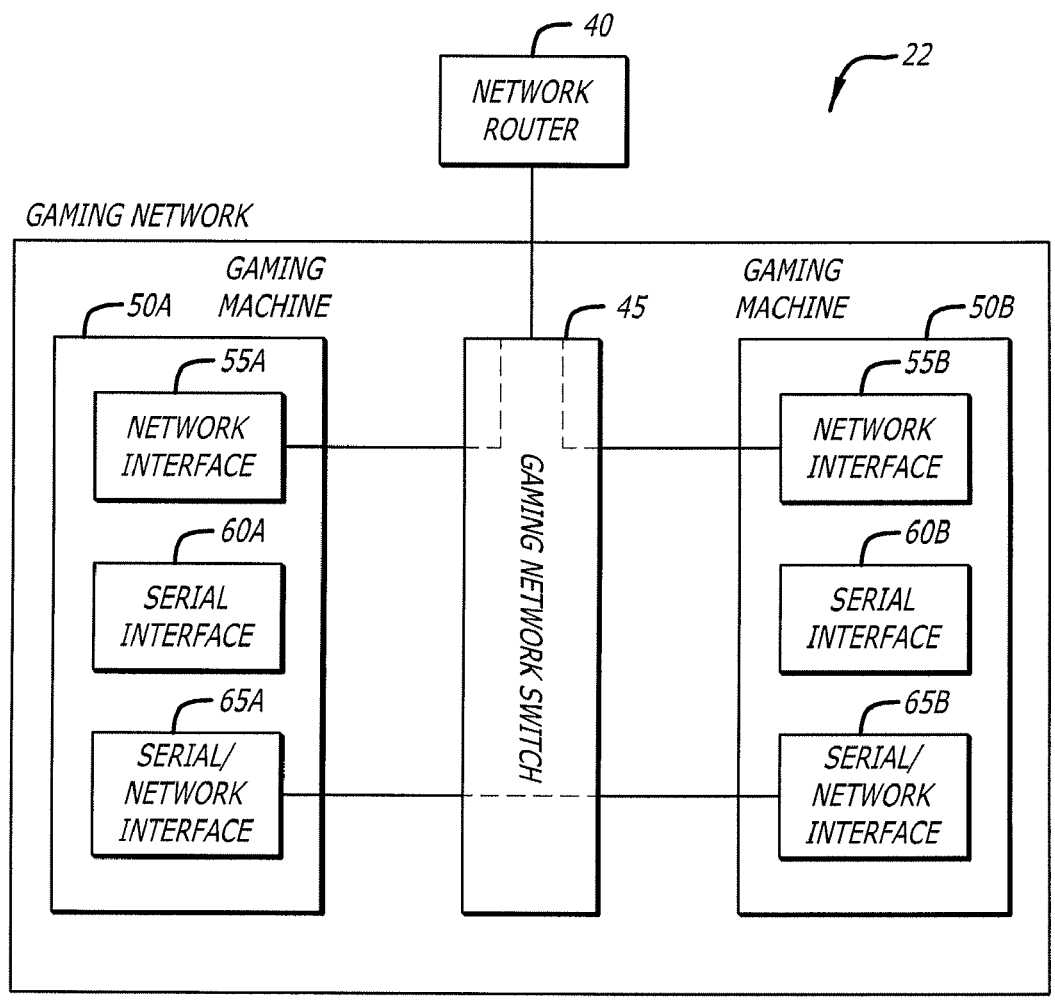
FIG. 4 illustrates a block diagram of a download and data transfer gaming system in accordance with another embodiment.

As depicted in FIG. 4, the gaming network 22 may include a network switch 45 and a plurality of gaming devices 12 connected thereto. The gaming devices 12 may be physically or logically distributed between one or more casinos based on the type of its gaming applications, manufacturers or other parameters known to those of skill in the art. The gaming devices 12 may also be physically organized into a LAN or logically into one or more Virtual LANs ("VLAN"). In one embodiment, each gaming device 12 contains programming logic, which may be embodied in the hardware and/or software, to facilitate presentation of gaming applications to the casino patrons. In one embodiment, a single gaming device 12 may provide several different gaming applications. In another embodiment, a gaming application may run across several gaming devices 12 within a single gaming network 22. The gaming device 12 may execute various gaming applications, such as video slots, mechanical slots, video poker, video blackjack, video keno, video bingo, video pachinko, as well as computerized table games, such as poker, blackjack, craps, roulette, and the like. In one embodiment, the gaming device 12 may comprise video gaming machines manufactured by Bally Technologies, Inc. or other manufactures.

Figure 5:
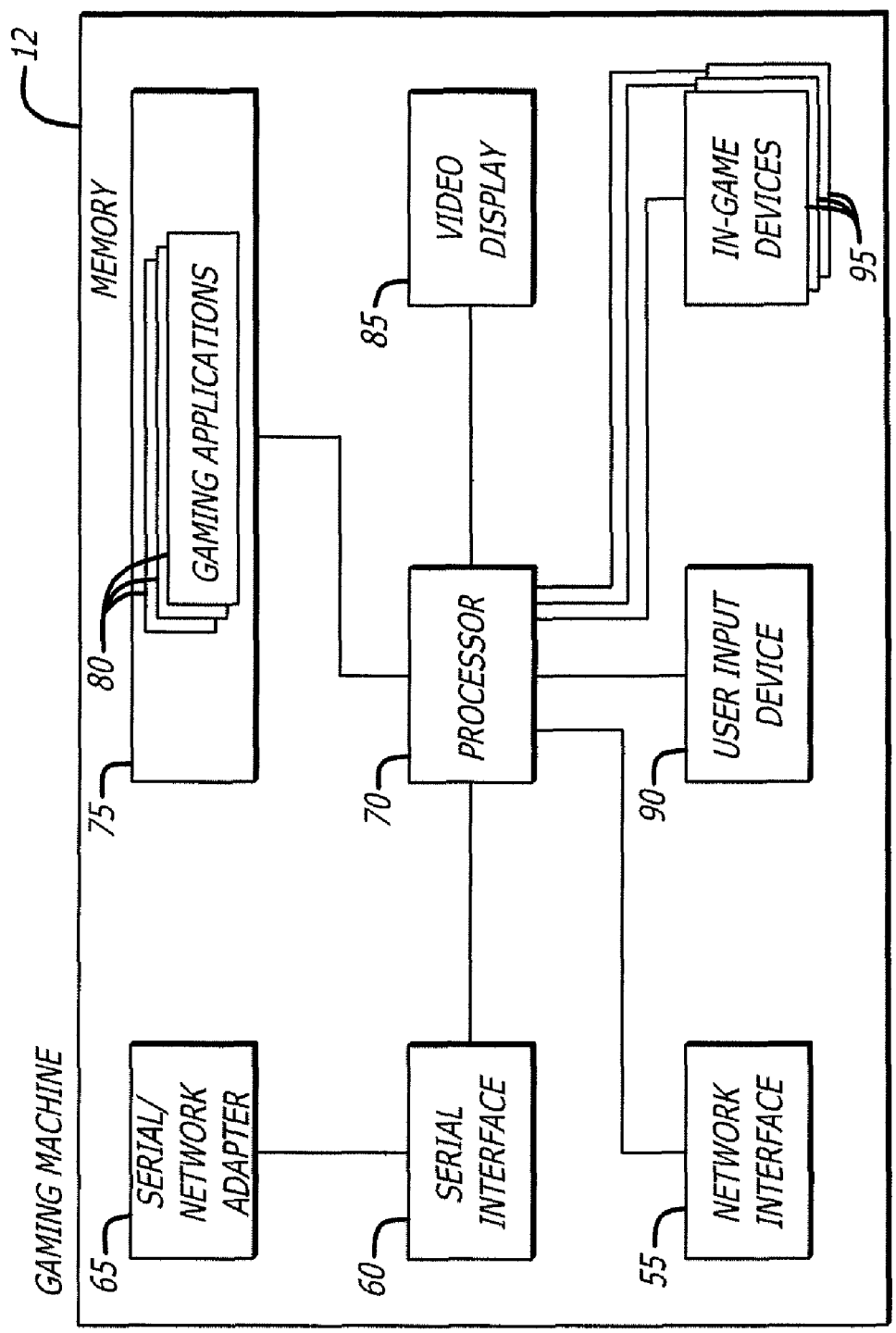
FIG. 5 illustrates a block diagram of a download and data transfer gaming system in accordance with still another embodiment.

FIG. 5 illustrates one embodiment of a gaming device 12. As depicted, the gaming device 12 comprises a microprocessor 70 and non-volatile memory 75 that stores one or more gaming applications 80, which are run by the microprocessor 70. The gaming device 12 further includes a video display 85, such as an LCD display, through which the gaming applications are presented to the casino patrons. The gaming device 12 may further include a user input device 90, such as a keyboard or various game-specific buttons (e.g., bet one, bet all, and the like). In one embodiment, the user input device 90 may include a touch screen. In some embodiments, the touch screen overlays the video display 85. The gaming device 12 may also include various in-game devices 95, such as credit card readers, coin and bill acceptors, casino patron card readers, and the like. In one embodiment, an in-game device 95 may comprise an embedded additional user interface (not depicted), such as an IVIEW interface described in the commonly owned U.S. patent application Ser. No. 10/943,771, entitled USER INTERFACE SYSTEM AND METHOD FOR A GAMING MACHINE, which is incorporated herein by reference. In one embodiment, the gaming device 12 also includes a network interface 55 and a serial interface 60, which may be connected to a serial-to-network adapter 65, the purpose of which will be described in greater detail hereinbelow.

As indicated above, the gaming device 12 comprises network interface 55, such as a network card, which facilitates IP-based communication with other networked devices. In a preferred embodiment, the network interface 55 may be operative under the control of the processor 70 to communicate with devices external to the gaming network 22, such as back office network servers, through network switch 45 and router 40, as will be described in greater detail below. For example, the network interface 55 may be used to download gaming applications or updates thereto from the application server 20. The network interface 55 may also be used to communicate with the billing server 25 when casino patrons place wagers using credit or debit cards. In another example, the network interface 55 may be configured to communicate with user authentication server 30, which maintains information about casino patrons. This information may be used to monitor patrons' winnings and rewards and to provide various personalized services to the casino patrons. In yet another example, the network interface 55 may be used by "in game" devices, such as the IVIEW interface, to communicate with external computer's servers, which provide advertisements and promotions-related information that is displayed on the IVIEW interface. The network interface 55 may be used for other purposes known to those of skill in the art.

As indicated above, the gaming device 12 also includes a serial interface 60, such as a Universal Serial Bus (USB), FireWire, High-Speed Serial Interface (HSSI), or the like. In a preferred embodiment, the serial interface 60 may be under the control of the processor 70 and communicate with devices internal to the gaming network 22, such as other gaming devices 12. In a particular embodiment, the serial interface 60 may be dedicated to intra- and inter-game communications, such as communications among gaming applications that run across several gaming devices 12 in the gaming network 22. For example, the serial interface 60 may be used by the gaming applications in a progressive networked gaming system in which several gaming devices 12 in a gaming network 22 compete for, and contribute to, a single jackpot price. In this networked gaming system, the gaming applications 80 may use serial interface 60 to exchange messages for synchronizing jackpot values, notify each other about winnings, and exchange other game-related information. In another embodiment, gaming applications 80 may communicate through serial interfaces 60 to set up group plays or tournaments across several gaming devices 12. Those of skill in the art will appreciate that there may be other applications of the serial interfaces 60.

To facilitate communication between the gaming applications 80 through the serial interfaces 60, the gaming devices 12 may be further equipped with serial-to-network adapters 65. For example, a serial-to-network adapter may include USB-to-Ethernet adapter, such as Netgear® USB 2.0 Fast Ethernet Adapter, or a USB-to-Wireless adapter, such as Lynksys® Wireless-G USB Network Adapter, or other types of adapters known to those of skill in the art. In one embodiment, the gaming devices 12 may be connected through their serial interfaces 60 and adapters 65 to a networking device, such as the aforementioned network switch 45. In another embodiment, another networking device, such as a switch or a router may be used to interconnect gaming devices 12 through their serial interfaces 60. Furthermore, to communicate through the serial-to-network interfaces, the gaming applications 80 may use a custom network protocol, such as one based on Universal Datagram Protocol (UDP), Transmission Control Protocol (TCP), or other network protocols known to those skilled in the art.

Referring again to FIG. 4, in one embodiment the gaming network 22 may include a network switch 45 or a similar networking device that facilitates data communication between gaming devices 12 and networking devices external to the gaming network 22. To that end, the network switch 45 may be connected to the network router 40. The switch 45 may be implemented as a programmable hardware or software network device, such as a switch, a router, an access point, or the like. In a preferred embodiment, the switch 45 may have an OSI Layer 2 (i.e., data link) and/or Layer 3 (i.e., network layer) switching capability. In addition, the switch 45 may support either a DHCP, BOOTP or similar IP address distribution protocol, as is described in greater detail below. In one embodiment, the in-game switch 60 includes a hardware-based network switch that supports DHCP, such as 3Com® 8800 series switches, Cisco Systems® Catalyst switches, Netgear® switches, Lynksys® switches, or the like. In an alternative embodiment, the in-game switch 60 may be implemented as a software component stored in the non-volatile memory of one of the gaming devices 12 in the gaming network 22.

In one embodiment, the network switch 45 may be configured to assign IP addresses to the network devices connected thereto. The IP address information may be provided to the network switch by the DHCP server 35 during system startup according to one embodiment. In another embodiment, the switch 45 may be manually configured by the system administrator with a default set of IP addresses. More specifically, the DHCP server 35 may transmit an IP address scope to the network switch 45 using, for example, DHCP, BOOTP or similar IP address distribution protocol. From the received IP address scope, the network switch 45 may assign IP addresses to the network devices connected to the first set of data ports and to the network devices connected to the second sets of data ports. Alternatively, the network switch may assign default IP addresses to the network devices connected thereto. Using the assigned IP addresses, the gaming devices 12 may communicate with the external network devices through the network interfaces 55, and with each other through the serial interfaces 60.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

The invention claimed is:

1. In a download and data transfer gaming system including a gaming network including at least one host server, a tracking server, and a plurality of gaming devices, wherein the gaming devices are capable of uploading and/or transferring data as well as receiving downloaded data, and a memory device storing a set of data to be distributed, wherein the set of data can be divided into a plurality of different subsets of data, a method for improving the download capabilities in a gaming environment by redistributing a data transfer burden, comprising:

the host server distributing an initial distribution of the plurality of different subsets of data to the plurality of gaming devices, wherein none of the plurality of gaming devices receives the entire set of data to be distributed from the host server; and the plurality of gaming devices distributing all further distributions of the plurality of different subsets of data only amongst each other until all of the gaming devices have received the entire set of data.

2. The method of claim 1, further comprising the tracking server tracking the download and data transfer of the set of data to be distributed to each of the plurality of gaming devices.

3. The method of claim 2, further comprising the tracking server tracking the download and data transfer of the set of data by tracking only metadata related to the download and data transfer.

4. The method of claim 1, wherein the host server and gaming device distributing steps comprise using a file distribution protocol which downloads and/or transfers subsets of data using a random distribution.

5. The method of claim 1, wherein the host server and gaming device distributing steps comprise using a file distribution protocol which downloads and/or transfers subsets of data by prioritizing rarest subsets of data for distribution.

6. The method of claim 1, wherein the host server and gaming device distributing steps comprise using a file distribution protocol which utilizes a tit-for-tat data exchange policy.

7. The method of claim 1, wherein the host server and gaming device distributing steps comprise using a file distribution protocol which utilizes a data exchange policy that results in Pareto equilibrium.

8. The method of claim 1, wherein the host server and gaming device distributing steps comprise using a file distribution protocol which enables the downloading and/or distributing of much larger files than can be managed using HTTP GET requests.

9. The method of claim 1, wherein the host server and gaming device distributing steps comprise using a file distribution protocol which is more redundant than HTTP GET requests and substantially prevents a gaming device from missing a download broadcast.

10. The method of claim 1, wherein the host server and gaming device distributing steps comprise using a file distribution protocol which substantially prevents losing packets and bad data integrity by using SHA-1 verification of the plurality of different subsets of data.

11. In a download and data transfer gaming system, including a gaming network including a tracking server and a plurality of gaming devices, wherein the gaming devices are enabled to transfer subsets of data to each other in addition to being enabled to receive data downloads, and a memory device storing a set of data to be distributed, wherein the sets of data is segmented into a plurality of different subsets of data, a method for improving data distribution capabilities in a gaming environment by reallocating a download burden from a single network device to a plurality of network devices, comprising:

the memory device distributing an initial distribution of the plurality of different subsets of data to the plurality of gaming devices, wherein none of the plurality of gaming devices receives the entire set of data to be distributed from the memory device; and the plurality of gaming devices distributing all further distributions of the plurality of different subsets of data only amongst each other until all of the gaming devices have received the entire set of data.

12. The method of claim 11, wherein the system further includes a tracking server and the method further comprises the tracking server tracking the download and data transfer of the set of data to be distributed to each of the plurality of gaming devices.

13. The method of claim 12, wherein the tracking of the download and data transfer of the set of data comprises tracking only metadata related to the download and data transfer.

14. The method of claim 11, wherein the memory device and gaming device distribution steps comprise using a file distribution protocol which downloads and/or transfers subsets of data using a random distribution.

15. The method of claim 11, wherein the memory device and gaming device distribution steps comprise using a file distribution protocol which downloads and/or transfers subsets of data by prioritizing rarest subsets of data for distribution.

16. The method of claim 11, wherein the memory device and gaming device distribution steps comprise using a file distribution protocol which utilizes a tit-for-tat data exchange policy.

17. The method of claim 11, wherein the memory device and gaming device distribution steps comprise using a file distribution protocol which utilizes a data exchange policy that results in Pareto equilibrium.

18. The method of claim 11, wherein the memory device and gaming device distribution steps comprise using a file distribution protocol which enables the downloading and/or distributing of much larger files that can be managed using HTTP GET requests.

19. The method of claim 11, wherein the memory device and gaming device distribution steps comprise using a file distribution protocol which is more redundant than HTTP GET requests and substantially prevents a gaming device from missing a download broadcast.

20. The method of claim 11, wherein the memory device and gaming device distribution steps comprise using a file distribution protocol which substantially prevents losing packets and bad data integrity by using SHA-1 verification of the plurality of different subsets of data.

* * * * *